Figures 1, 2:
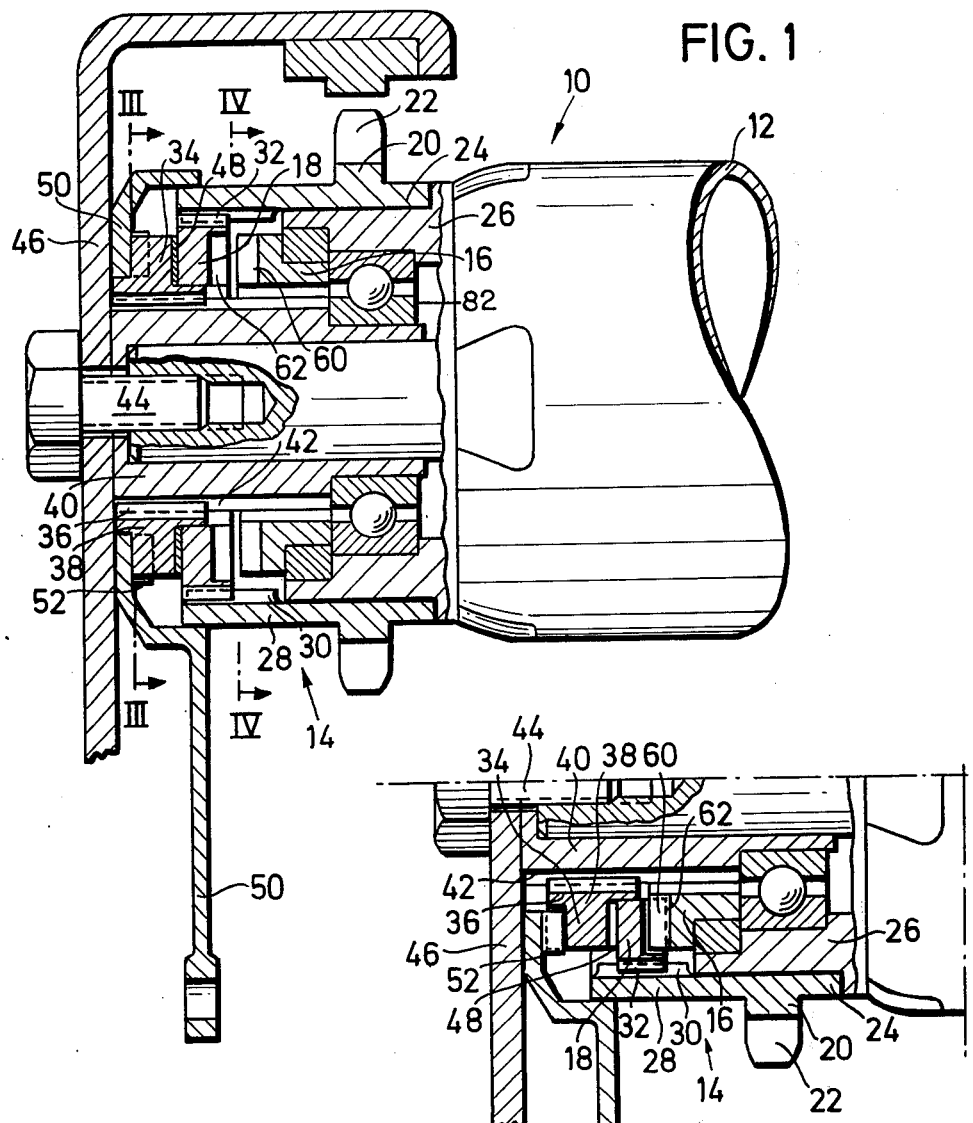

United States Patent [19]

vom Stein

[11] 4,063,636
[45] Dec. 20, 1977

[54] DISCONNECTABLE DRIVING ROLLER FOR ROLLER CONVEYORS

[75] Inventor: Hans vom Stein, Wermelskirchen, Germany

[73] Assignee: Interroll Fordertechnik GmbH & Co. KG, Dhunn, Germany

[21] Appl. No.: 681,329

[22] Filed: Apr. 28, 1976

[30] Foreign Application Priority Data

Apr. 30, 1975 Germany .............................. 2519374

[51] Int. Cl.² .............................................. B65G 13/06
[52] U.S. Cl. ...................................... 198/781; 198/789
[58] Field of Search ............... 198/780, 781, 789, 790, 198/791

[56] References Cited

U.S. PATENT DOCUMENTS

| | | | |
|---|---|---|---|
| 3,327,837 | 6/1967 | Covell | 198/789 |
| 3,567,010 | 3/1971 | vom Stein | 198/781 |
| 3,605,990 | 9/1971 | Cowen | 198/781 |
| 3,610,406 | 10/1971 | Fleischauer et al. | 198/789 |
| 3,729,088 | 4/1973 | vom Stein et al. | 198/781 |

FOREIGN PATENT DOCUMENTS

| | | | |
|---|---|---|---|
| 1,556,724 | 2/1974 | Germany | 198/781 |
| 256,621 | 6/1970 | U.S.S.R. | 198/781 |

*Primary Examiner*—Evon C. Blunk
*Assistant Examiner*—Jeffrey V. Nase
*Attorney, Agent, or Firm*—Anthony J. Casella

[57] ABSTRACT

A disconnectable driving roller for roller conveyors having individual driving roller groups isolatable from a common conveyor drive comprising a driving wheel having a dog coupling for connecting the driving wheel to the roller, which includes a first axially slidable coupling; pivotally mounted coupling lever; and an axially slidable actuating disc between said coupling lever and the first coupling, with the coupling lever and the actuating disc having cooperating cams. The arrangement is such that when the coupling lever is moved from a disengaging to an engaging position, the cam disc is moved and in turn moves the first coupling into its position connecting the drive wheel to the roller.

23 Claims, 7 Drawing Figures

DISCONNECTABLE DRIVING ROLLER FOR ROLLER CONVEYORS

The invention relates to a disconnectable driving roller for roller conveyors which exhibit individual driving roller groups isolatable by control levers from a common conveyor drive, with a driving wheel connectable and disconnectable through the intermediary of a dog coupling with coupling element axially slidable to the roller axis.

In a known roller conveyor with driving roller groups isolatable from a common conveyor drive each coupling exhibits an axially slidable dog coupling known per se which is provided with an actuating surface for the attack of an actuating rod mounted on the side cheek, exhibiting a wedge surface and slidable transversely to the sliding direction of the coupling.

In this known roller conveyor a large number of dog couplings are actuated simultaneously by a single actuating rod which attacks eccentrically the sliding element of the dog couplings. The reliable actuation of a large number of dog couplings during long periods of service is not ensured by this means. Furthermore it is necessary in a limit position to retain the actuating rod counter to the forces which react from the couplings onto the actuating rod.

The aim of the invention is to develop a driving roller of the type initially defined in such a way that a reliable connection and disconnection of all the dog couplings is ensured in simple manner even during long periods of service, whilst simultaneously no forces can influence the actuating rod either in the connected state or in the disconnected state of the dog couplings.

The present invention provides a disconnectable driving roller for roller conveyors having individual roller groups isolatable from a common conveyor drive comprising a roller mounted at one end on a roller axle, a driving wheels means connectable to a dog coupling means including a first coupling element mounted for sliding axial movement on said roller axle, a coupling lever pivotally mounted on said roller axle and having an axially projecting cam with a cam surface substantially in a plane parallel to the pivotal plane of the coupling lever, and an actuating disc mounted for sliding axial movement whilst substantially fixed rotationally on the roller axle between the coupling element and the coupling lever, said actuating disc having a cam follower with its cam surface substantially in a plane parallel to the pivotal plane of the coupling lever and arranged for cooperation with said cam of the coupling lever so that when said coupling lever is moved from a disengaging position to an engaging position said first coupling element is moved axially by said actuating disc from a disconnecting position to a connecting position in which latter position it connects said driving wheel means to the roller.

At the same time it is preferably provided that both the coupling lever and also the actuating disc exhibit at least four cams arranges at equal mutual intervals and that the principal plane of the wedge ramps encloses an angle between 30° and 60°, more particularly 45°, with the roller axis.

A considerable advantage of the invention lies in the fact that the actuating forces always attack the slidable coupling element symmetrically and thus ensure the correct functioning of the coupling. Moreover, only fairly short pivotal movements are necessary for the coupling lever.

Another essential advantage of the invention is that the coupling lever, both in the connected and also in the disconnected position of the associated dog coupling, is not influenced by forces from the dog coupling, because by virtue of the construction according to the invention the cams determine both the engaged and also the disengaged position of the dog coupling by stops.

In a further development of the invention, the actuating disc is constructed with a ring-shaped web exhibiting a female tooth system and is arranged by the latter on a bushing retained firmly in rotation and exhibiting a complementary male tooth system. In this case the ring-shaped web of the actuating disc preferably exhibits on the one hand a sliding bearing flange for the coupling lever and on the other hand a sliding bearing flange for the axially slidable coupling element. Furthermore, the actuating disc is advantageously arranged towards the slidable coupling element, whereas a sliding ring is preferably arranged between actuating disc and coupling element.

According to a preferred further development of the invention, it is provided that the driving wheel is constructed with a sliding bearing ring which is arranged on a roller lug constructed as a counter sliding ring, whilst advantageously the coupling element associated with the driving roller and exhibiting dogs directed axially outwards is arranged coaxially within the sliding bearing ring and is attached firmly in rotation to the roller lug.

It is further provided according to a preferred development of the invention that the axially slidable coupling element is arranged with oppositely directed dogs coaxially within an axial ring-shaped lug of the sliding bearing ring and is connected to the latter integrally in rotation and with mutual axial sliding mobility by means of a tooth system.

The last-mentioned further development exhibits the advantage both that the driving roller coupling element is maintained integrally in rotation with the driving roller at all times, and also the axially slidable coupling element is so maintained with the drive of the conveyor. Thus just after disconnection both coupling elements are still rotating in the same sense, and can immediately be reconnected because they exhibit practially no relative rotation.

In another embodiment of the invention it is provided that the sliding bearing ring is constructed with a ring-shaped flange exhibiting dogs directed axially outwards and arranged coaxially to the driving roller element, and that the axially slidable coupling element is engageable by dogs directed in opposite axial directions, simultaneously into the dogs of the ring-shaped flange and those of the driving roller coupling element.

According to a particularly preferred embodiment, each dog of the coupling elements exhibits an approach ramp which is inclined axially away from the opposite dogs in the direction of rotation of the drive and merges at its axially back-set end into the base of a stop ramp, and at its axially forward-set end into the head end of the previous stop ramp in the direction of rotation of the drive. In this case the principal plane of the stop ramps of the coupling elements is advantageously inclined away from the approach ramps forwards in the direction of rotation of the drive at an angle other than 0° to the roller axis. In this case the angle is preferably between 6° and 10° and preferably 8°.

The above-described embodiment exhibits the advantage that the dog couplings passes spontaneously into the disengaged position as soon as the coupling lever has been pivoted into the position for this purpose. Consequently pretensioning springs are totally unnecessary.

According to another preferred embodiment of the invention it is provided that the driving roller coupling element is connected integrally in rotation to the driving roller by means of rotary stops in the direction of rotation of the drive and is pre-tensioned counter to the direction of rotation of the drive away from the rotary stops by a preselected rotary play. It is then advantageously provided that the driving roller coupling element is arranged coaxially within the roller lug rotatably by means of sliding bearings and exhibits radially directed lugs which are inserted into radially directed and circumferentially bounded recesses in the roller lug, and that at least two helicoidal springs arranged diagonally opposite are attached by one end to the roller lug and by the other end to the driving roller coupling element and are set under slight traction.

The preselected rotary play preferably exhibits an angle between 20° and 40° and more particularly 30°.

The advantage of the above-described embodiment lies in the fact that even in case a large number of driving rollers are required to be connected or disconnected simultaneously, this large number of dog couplings can be operated in a functionally reliable manner. For even in case the mutually confronting tips of the dogs of the coupling element should clash during their mutual engagement, the couplings can still engage reliably because the coupling element attached to the driving roller can escape in the direction of rotation of the drive counter to its slight pre-tension.

The above described driving roller is suitable more particularly for the case that the control levers actuating the driving roller sets are arranged in the conveyor path and are actuable by the good conveyed.

Figure 3:
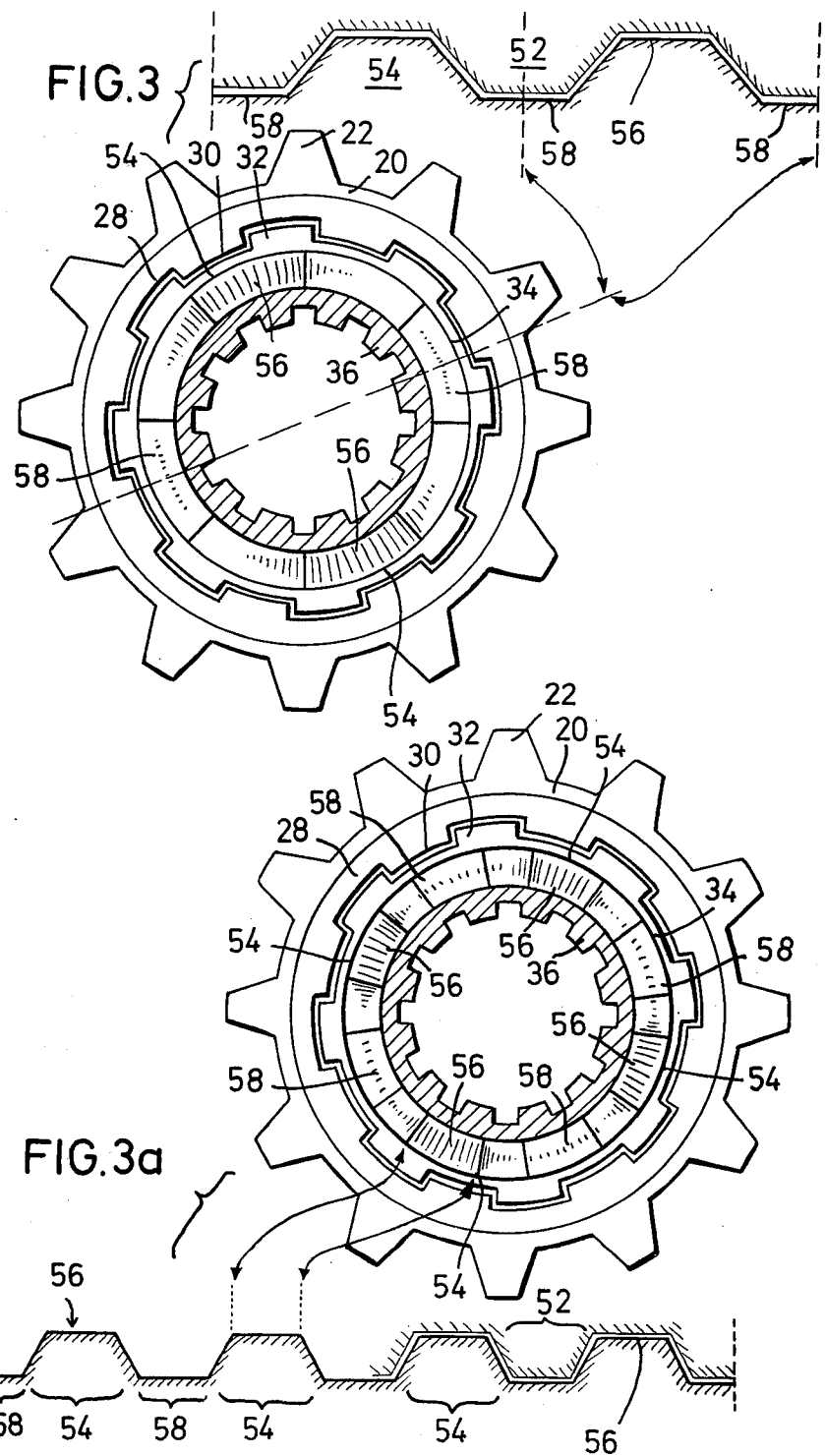
Figure 4:
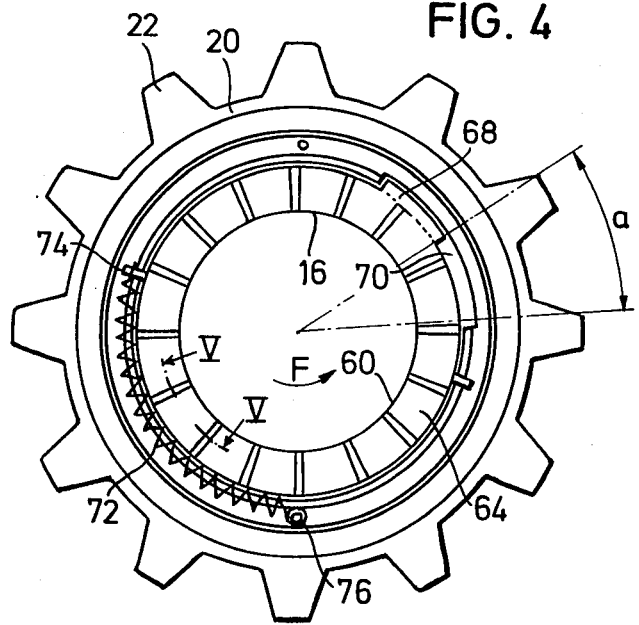
Figure 5:
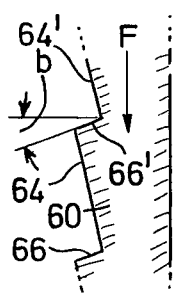
Figure 6:
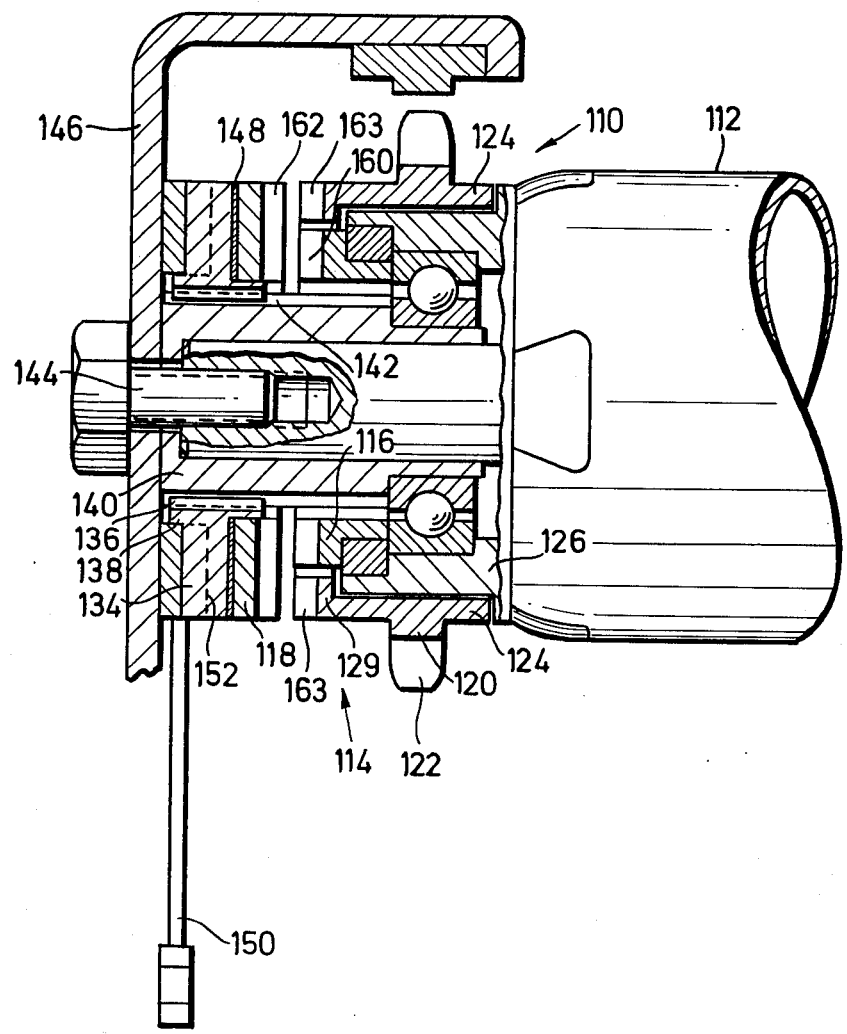

The invention is described hereinbelow in exemplary manner with reference to the accompanying schematic drawing wherein:

FIG. 1 shows a partial sectional view of an end part of a driving roller with associated dog coupling, in which the dog coupling is illustrated in the disengaged state, FIG. 2 shows a view similar to the lower part in FIG. 1, but in which the dog coupling is illustrated in the engaged state, FIGS. 3, 3a show a sectional view made along the line III—III in FIG. 1, in which more particularly the actuating disc of the dog coupling constructed with cams is shown, FIG. 4 shows a sectional view made along the line IV—IV in FIG. 1, in which more particularly the coupling element with dogs associated with the driving roller and a pre-tensioning spring are shown, FIG. 5 shows a view in the direction of the arrow V—V in FIG. 1 of a part of the dogs of the coupling element and FIG. 6 shows a view similar to FIG. 1 of a further embodiment of the invention, in which likewise the dog coupling is illustrated in the disengaged state.

According to FIG. 1 a driving roller 10 comprises a tubular roller envelope 12 and a dog coupling 14 arranged at one end face of the roller envelope 12.

According to FIG. 1, the dog coupling 14 is constructed with a driving roller coupling element 16 connected firmly in rotation to the roller envelope 12 in the drive direction and with a coupling element 18 slidable axially to the roller axle.

A driving wheel 20 which is illustrated as a chain wheel with chain teeth 22, is constructed with a sliding bearing ring 24 which is arranged on a lug constructed as a counter sliding ring 26 on the end face of the roller envelope 12.

In the embodiment illustrated in FIG. 1, the sliding bearing ring 24 is provided on its side remote from the roller envelope 12 with an axial ring-shaped lug 28 which is constructed with a female tooth system 30.

In the embodiment illustrated in FIGS. 1 to 5, both the driving roller coupling element 16 and also the axially slidable coupling element 18 are arranged coaxially within the sliding bearing ring 24 and within the axial ring-shaped lug 28 of the latter. The axially slidable coupling element 18 is constructed on its external circumference with a male tooth system 32 which is in mesh with the female tooth system 30 of the ring-shaped lug.

By this means the driving wheel 20 and the axially slidable coupling element 18 are connected together firmly in rotation, but are mutually axially slidable.

An actuating disc 34 for the axially slidable coupling element 18 is arranged on its side remote from the roller envelope 12, which is constructed with a female tooth system 36 on the surface directed radially inwards of a ring-shaped web 38 manufactured integrally with the actuating disc 34. The actuating disc 34 is arranged coaxially round a bushing 40 fitted integrally in rotation which is constructed with a male tooth system 42 which meshes mutually with the female tooth system 36 of the actuating disc 34. By this means the actuating disc 34 is maintained firmly in rotation, but is slidable in the direction of the roller axis. The bushing 40 can be fitted firmly in rotation by clamping by means of the axle or screw 44 illustrated against the roller way section 46 illustrated. The screw 44 may also be constructed with a shank part of circular cross-section which engages into a complementary acircular bore in the bushing 40 and thereby maintains the latter integrally in rotation.

A sliding ring 48 is inserted between the axially slidable coupling element 18 and the actuating disc 34 in order to reduce to a minimum, in the connected state of the dog coupling 14, the frictional forces between the axially slidable coupling element 18, which is then rotated, on the one hand and the actuating disc 34 which is maintained firmly in rotation.

A coupling lever 50 is fitted on that side of the actuating disc 34 remote from the roller envelope 12 and mounted pivotably about the roller axis.

The ring-shaped web 38 of the actuating disc 34 is constructed on its side confronting the roller envelope 12 with a sliding bearing flange for the axially slidable coupling element 18, and on its side remote from the roller envelope 12 - considered with reference to the actuating disc 34 itself with a sliding bearing flange for the coupling lever 50.

As shown more particularly in FIGS. 3,3a both the coupling lever 50 and also the actuating disc 34 are constructed with cams 52 or 54 respectively arranged at equal mutual intervals around the peripheries of the lever 50 and disc 34 and disposed opposite each other with their interacting cam surfaces, (only cam surfaces 56 of the actuating disc 34 are illustrated as shown in plan in FIGS. 3,3a) in a plane substantially parallel to the pivotal plane of the coupling lever 50.

Each cam 54 and 52 of the actuating disc 34 and of the coupling lever 50, respectively, is trapezoidal in cross section, the inclined sides of the trapezium providing oppositely directed wedge-shaped ramps and the shorter one of the parallel side providing a forward stop surface. The ends of the ramps remote from the forward stop surface lead into a back-set stop surface (only back-set stop surfaces 58 of the actuating disc 34 are illustrated in FIGS. 3,3a) which stop surfaces are parallel to the pivotal plane of the coupling lever 50. In the embodiment illustrated the principal plane of the wedge-shaped ramps encloses an angle of 45° with the roller axis.

According to FIGS. 1 and 2 the dogs 60 of the driving roller coupling element 16 are directed axially outwards from the roller and the dogs 62 of the axially slidable coupling element 18 axially inwards towards the roller. The dogs 60 of the driving roller coupling element 16 are shown in greater detail in FIGS. 4 and 5.

Each dog 60 comprises an approach ramp 64 which is inclined axially in the direction of rotation of the drive away from the opposite dog 62 of the axially slidable coupling element 18 and merges at its axially back-set end into the base of a stop ramp 66 and at its axially forward-set end into the head end of the previous stop ramp 66' in the direction of rotation of the drive.

The principal plane of the stop ramps 66 and 66' of the dogs 60 and 62 is arranged inclined forwards in the direction of rotation of the drive F away from the associated approach ramp 64 or 64' at an angle $b$ other than 0° to the roller longitudinal axis. This angle $b$ is 8° in the embodiment illustrated.

The driving roller coupling element 16 is further connected in the direction of rotation of the drive to the driving roller 10 and to its lug constituting the counter sliding ring 26 by means of rotary stops which are provided around the circumference of the driving roller coupling element 16 and one of which is provided in FIG. 4 with a radially directed lug 68 on the driving roller coupling element 16 and with an associated likewise radially oriented and peripherally limited recess 70 in the roller lug constituting the counter sliding ring 26.

The dimensions in the peripheral direction of the lug 68 on the one hand and of the recesses 70 on the other hand are dimensioned so that the driving roller coupling element 16 exhibits a rotary play with the angle $a$ in the roller lug constituting the counter sliding ring 26. The angle $a$ is 25° in the embodiment illustrated.

Two traction springs arranged diagonally opposite, of which only the traction spring 72 is illustrated, pre-tension the driving roller coupling element 16 in the roller lug counter to the direction of rotation of the drive by the angle $a$ of the rotary play. As illustrated in FIG. 4, the rotary play has already been eliminated, i.e. the driving roller coupling element 16 is already pre-tensioned in the direction of rotation of the drive by the angle $a$ of the rotary play counter to the force of the traction spring 72 and is in contact with its radial lugs 68 against the boundary wall of the recesses 70.

The driving roller coupling element 16 is easily rotatable in the roller lug 26 by means of sliding bearings 82. Moreover, the driving roller coupling element 16 extends beyond the roller lug 26 somewhat and has on its projecting part two radially directed pins 74 arranged diagonally opposite one another.

On the axially outwardly orientated end face of the roller lug constituting the roller lug 26, two axially orientated pins 76 arranged diagonally opposite one another are likewise provided. The pins 74 of the driving roller coupling element 16 on the one hand and the pins 76 on the roller lug 26 on the other hand are mutually staggered so that each traction spring 72 is retained by one end on a pin 74 and by its other end on a pin 76 and is placed under slight tension even in its contracted operating position, i.e. when the rotary play with the angle is eliminated, and thereby keeps the driving roller coupling element 16 pre-tensioned by the angle $a$ of the rotary play away from the rotary stops counter to the direction of rotation of the drive.

In the further embodiment illustrated in FIG. 6, identical parts to be embodiment illustrated in FIGS. 1 to 5 are designated by the same reference numerals preceded by the digit "1".

The further embodiment illustrated in FIG. 6 differs from the embodiment illustrated in FIGS. 1 to 5 substantially only by a different construction of the dog coupling 114. In this embodiment, the sliding bearing ring 124 which is constructed conjointly with the driving wheel 120 exhibiting the chain teeth 122 is provided with a ring-shaped flange exhibiting axially outward directed dogs 163 and arranged coaxially to the driving roller coupling element 116. The dog teeth 163 of the sliding bearing ring 124 and the dog teeth 160 of the driving roller coupling element 116 are oriented in the same direction and arranged coaxially in a common plane, so that the axially slidable coupling element 118 is engageable by its axially oppositely directed dog 162 simultaneously with the dogs 163 of the ring-shaped flange 129 and the dogs 160 of the driving roller coupling element 116.

The following mode of function is achieved by the construction according to the invention of the actuating disc and also of the coupling lever with the cams illustrated. Both in the one limit position of the actuating lever in which the dog coupling is disengaged, and also in the other limit position of the actuating lever, in which the dog coupling is fully engaged, no forces act from the dog coupling upon the acutating lever, i.e. the actuating lever remains free of forces in both these two limit positions. In contradistinction hereto, in the case of a wedge surface extending over 360°, or even a plurality of wedge surfaces consecutively adjacent in the peripheral direction without a cam face or stop face parallel to the pivotal plane, it would be necessary to maintain the actuating lever at least in the one limit position in which the dog coupling is engaged, in order to intercept the forces then exerted by the dog coupling upon the actuating lever.

The following mode of functioning is achieved by the construction of the stop ramps of the dog teeth with a slight inclination of 8° forwards in the direction of rotation according to FIG. 5. As soon as the actuating lever is pivoted from its one limit position in which the dog coupling is engaged into the other limit position in which the dog coupling can be disengaged, the driving roller coupling element and the axially slidable coupling element become disengaged, because the mutually abutting stop ramps can slide down on one another because the axially slidable coupling element is no more retained axially. A pre-tension spring which pre-tensions the coupling element into the disengaged position of the coupling is therefore superfluous.

The following mode of function is achieved by the construction, shown in greater detail in FIG. 4, of the rotary play with the angle $a$ between the driving roller coupling element and the roller lug of the driving roller itself. In the case of a plurality of dog couplings connected simultaneously to a common drive it frequently occurs that the head sections of the stop ramps of the dogs of the coupling elements slid towards each other strike one another and at least temporarily prevent any further engagement of the coupling elements. This disturbs or even interrupts the control operation unless a suitable precaution has been taken. Due to the construction according to the invention of the rotary play between the driving roller coupling element and the driving roller itself and the pre-tensioning of the driving roller coupling element counter to the direction of rotation of the drive of the driving roller, it is achieved that even in case the stop ramps of opposite dogs should strike one another during the engagement of the coupling elements, the driving roller coupling element can escape in the direction of rotation of the drive without this being prevented by any forces which may be attacking the driving rollers.

What is claimed is:

1. A disconnectable driving roller for roller conveyors having individual driving roller groups isolatable from a common conveyor drive comprising:
   a driving wheel,
   a roller axle, a roller having a one end, said roller being mounted at said one end on said roller axle;
   driving means for driving said roller, said driving means having dog coupling means for drivingly connecting and disconnecting said driving wheel to and from said roller;
   said dog coupling means including a first coupling means mounted for sliding axial movement between an operatively engaged position and an operatively disengaged position of said driving means on said roller axle;
   coupling lever means pivotally mounted on said roller axle, for pivoting in a pivotal plane transverse to the roller axle for moving said first coupling means between an operatively engaged and an operatively disengaged position, said coupling lever having an axially projecting cam with a cam surface substantially in a plane parallel to said pivotal plane;
   an actuating disc mounted for sliding axial movement while substantially fixed rotationally on said roller axle between said first coupling means and said coupling lever means; and
   said actuating disc having a cam follower with a cam surface substantially in a plane parallel to said pivotal plane and arranged for cooperation with said cam of said coupling lever means so that when said coupling lever means is pivoted from said disengaged position to said engaged position, said first coupling means is moved axially from said operatively disengaged position to said operatively engaged position by said actuating disc whereby said driving means is drivingly connected to said roller.

2. The device of claim 1 wherein said one end of said roller has an axially projecting extension portion on which extension portion said driving wheel is rotatably mounted.

3. The device of claim 2 wherein said dog coupling means has a second coupling means which is attached to said roller extension portion for rotation therewith and is disposed for coupling with said first coupling means.

4. The device of claim 3 wherein said first coupling means has a male tooth means and said driving wheel has a complementary female tooth means, said male and female tooth means are operative to provide for sliding coaxial movement of said first coupling means between its operatively engaged and operatively disengaged positions in said driving means while maintaining them in a fixed rotational relation for rotation together with each other.

5. The device of claim 3 wherein said driving means has driving wheel coupling means arranged for coupling with said first coupling means simultaneously with the coupling of said first coupling means with said second coupling means in said operatively engaged position of said first coupling means.

6. The device of claim 3 wherein each said first and second coupling means has at least one dog means for drivingly connecting and disconnecting said drive wheel to and from said roller, which dog means comprises an approach ramp and a stop ramp, said approach ramp leading into said stop ramp, said approach ramp being inclined axially towards said rotational plane in a forward direction of rotation, and said stop ramp being inclined forwards away from said approach ramp in said forward direction of rotation.

7. The device of claim 6 wherein each said first and second coupling means is rotatable about a rotational axis and said stop ramp is inclined at an angle of from 6° to 10° from said rotational axis.

8. The device of claim 7 wherein said angle is 8°.

9. The device of claim 3 wherein said second coupling means is attached to said roller extension portion for rotation therewith with a predetermined angle of rotational play.

10. The device of claim 9 wherein said second coupling means is drivingly rotatable in a forward direction of rotation when said driving means is connected to said roller and wherein biasing means are provided for resiliently biasing said second coupling means in a direction counter to said forward direction of rotation.

11. The device of claim 10 wherein said resilient biasing means comprise at least two diametrically opposed helical springs, each said spring having a one end attached to said second coupling means and a second end attached to said roller extension portion.

12. The device of claim 11 wherein one of said second coupling means and said roller extension portion has a peripheral recess having a first end and a second end and the other has a radially extending lug means arranged for limited peripheral movement in said recess between said first and second ends whereby said angle of rotational play is determined.

13. The device of claim 12 wherein said angle is from 20° to 40°.

14. The device of claim 13 wherein said angle is 30°.

15. The device of claim 1 wherein said actuating disc has a female tooth means and said roller axle has completentary male tooth means, said female and male tooth means operative to provide for sliding coaxial movement of said actuating disc on said roller axle while maintaining them in a fixed rotational relation for rotation together with each other.

16. The device of claim 1 wherein said actuating disc has a one end formed as a bearing support for said coupling lever means and a second end formed as a bearing support for said first coupling means.

17. The device of claim 1 wherein is provided bearing ring means between said actuating disc and said first coupling means whereby rotation of said first coupling means relative to said actuating disc is facilitated.

18. The device of claim 1 wherein at least two said cams and cam followers are provided symmetrically peripherally disposed on said coupling lever means and said actuating disc, respectively, said cam surfaces of said cams and cam followers being complementary with each other whereby in said disengaged position of said coupling lever means said cam surfaces mesh in with each other.

19. The device of claim 18 wherein at least four symmetrically peripherally disposed cams and cam followers are provided.

20. The device of claim 18 wherein said roller is rotatable about a roller axis and wherein each said cam has a wedge shaped ramp enclosing an angle of from 30° to 60° with said roller axis.

21. The device of claim 19 wherein said angle is 45°.

22. The device of claim 1 when mounted in a roller conveyor.

23. The device of claim 22 wherein said coupling lever means is disposed for actuation by goods being conveyed by said roller conveyor.

* * * * *